No. 894,350.
PATENTED JULY 28, 1908.
H. W. TROTT.
TEST APPARATUS.
APPLICATION FILED FEB. 20, 1907.
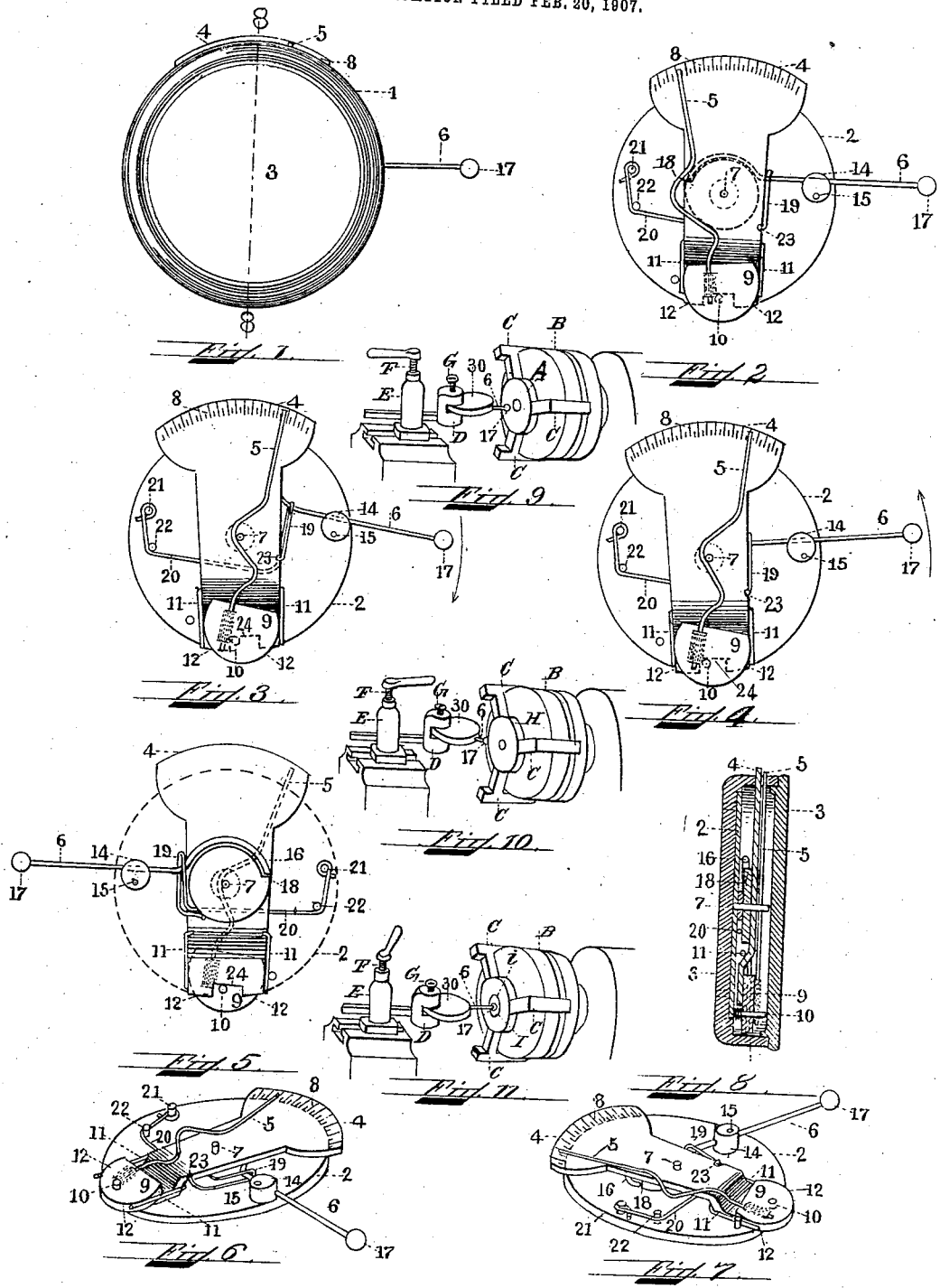

UNITED STATES PATENT OFFICE.

HARRY W. TROTT, OF WATERTOWN, MASSACHUSETTS.

TEST APPARATUS.

No. 894,350.  Specification of Letters Patent.  Patented July 28, 1908.

Application filed February 20, 1907. Serial No. 358,498.

*To all whom it may concern:*

Be it known that I, HARRY W. TROTT, a citizen of the United States, residing at Watertown, in the county of Middlesex and State of Massachusetts, have invented a certain new and useful Test Apparatus, of which the following is a specification, reference being had therein to the accompanying drawing.

My invention may be more particularly described as a dial test indicator.

The objects of my invention are, for example, to provide an indicator which is simple in construction, that has a wider application in its use than any heretofore employed, in that it may be operated in what have been heretofore positions inaccessible to the usual test apparatus; further, that has no glass front, easily broken; that has a test pointer, the movement of which is small, yet enough to serve its purpose perfectly; that has a test pointer and graduated plate that move in parallel planes, and are in plain view, i. e. in substantially a horizontal position; that has its parts compact, and protected against injury and disorganization.

Figure 1 is a top plan of my invention inclosed in its case; Fig. 2 shows the coöperating parts of my invention removed from the case, and being in normal position; Fig. 3 shows the position of the coöperating parts when the pointer arm is moved out of normal position, in the direction indicated by the arrow; Fig. 4 is a like view showing the positions of the parts, brought about by a movement of the pointer arm when moved in an opposite direction; Fig. 5 shows a bottom view of said coöperating parts when in normal position; Figs. 6 and 7 are perspective views more clearly showing the relative positions of the coöperating parts in normal position; Fig. 8 is a section of Fig. 1 on line 8—8; Fig. 9 shows my test apparatus mounted in the tool post of a lathe and in use for the purpose of determining whether the face of a piece of material in the chuck is running true; Fig. 10 shows said testing apparatus used to determine whether the circumference of a ring runs true; and Fig. 11 shows said apparatus testing whether the inner circumference of the hole in a piece runs true.

The drawings illustrate the principle of my invention, and the best mode now known to me of applying that principle. The coöperating parts are contained in a case 1, Figs. 1 and 8, and are mounted upon a base 2, which in turn is secured in the case, provided with a removably secured cap 3.

The device may be said to consist of three principal elements, a graduated plate 4, pointer 5, and a test arm 6.

The graduated plate 4 is pivoted centrally, so that it will balance upon its supporting pivot 7, fixed in the base 2. One end portion of this plate is provided with graduations 8, whereby may be determined the amount of movement of test or contact arm, later to be described; while the other end portion is designed to engage and operate by suitable means, the pointer 5. This pointer 5 may be made up of a carrier portion 9, sustained upon a pivot 10 in the base 2 and, for the purpose of economizing space, overlie the end portion of the graduated plate 4. This portion, to further economize space, may be bent downward to lie in a plane parallel to that of the other portion of the graduated plate. To this carrier portion 9 of the pointer 5, is fixed the pointing wire which may, in a manner to be described later, be moved over the graduations.

The carrier portion 9 is operatively connected to the graduated plate 4 by means of two wire arms 11 fixed to the plate, and keenly fitted to engage the sides 12 of the carrier 9, which sides are portions of the same circle. The carrier is held out of contact with the graduated plate by means of a spring wound about the pivot 10, and forming a washer bearing for the carrier. See Fig 8. The pivot 7 of the graduated plate 4 passes up through said plate for the purpose of having a bearing in the cap 3 of the case 1 to steady the movement of the graduated plate 4, and the pointing wire is bent in the manner shown so that the pivot will not interfere with the movement of the pointing arm.

That the relative movement of the test or contact arm 6 may be indicated, it is operatively connected with the graduated plate 4 in the following manner. The arm 6 is mounted in the pivot block 14 which in turn is pivoted on a pin 15, in the base plate 2. The operating end 16 of the arm 6, opposite the contact end 17, Fig. 7, engages a shoulder or point 18, on the under side of the graduated plate 4; the pivot of said plate, lying between the said pivot block 14 and the shoulder 18; and said arm being bent about said graduated plate pivot, to economize space occupied by parts.

The graduated plate 4 is connected to the test arm 6, also by a link 19. This link may be a part of a spring 20, one end of which is made fast to the base by pins 21, 22, while the other engages a slot 23, in the graduated plate 4. This bend 19 so engages the arm 6 that when the arm is released, the spring 20 causes the test arm 6, as well as the graduated plate 4, to return to normal position where they are held steady by the spring.

The extreme movements of the graduated plate are limited by a slot 24, Fig. 5, in the end portion of the graduated plate 4, the sides of said slot being brought into contact with the pivot 10 of the pointer carrier 9.

Let us suppose the test arm 6, Fig. 2, is moved in the direction indicated by the arrow in Fig. 3. It engages the link 19 of the spring 20, and causes the graduated plate 4 to move upon its pivot 7, to the left, but as this plate is operatively connected to the pointer carrier 9 by the wire arms 11, which engage the sides 12 of the carrier, these arms cause the carrier plate to turn upon its point 10 in an opposite direction to that of the graduated plate, and by their combined movements, the pointer travels over the graduations 8. If the test arm 6 is moved enough, the shoulders of the slot 24 in the graduated plate 4, contact the point pin 10, and thus limit the forward and back movements of the pointer and the graduated plate. When the test arm 6 is released, the spring 20, engaging the test arm, and also the graduated plate at slot 23, causes them both to return to normal position.

Should the test arm be moved in the direction indicated by the arrow in Fig. 4, then it would engage the shoulder 18, Figs. 2 and 7, on the graduated arm, and cause the graduated arm and the pointer to move as before; but in so doing the test arm 6, moves out of engagement with the link 19, Figs. 4 and 5, and the spring 20, Fig. 5, fixed to the graduated plate in the slot 23, Figs. 4, 5, 6, and constantly tends to cause the said plate to return to normal position. A greater or less movement of the test arm in either direction, causes corresponding but multiplied relative movements of the test arm and the graduated plate. By having the latter plate and the test arm move simultaneously in opposite directions, the real movement of the test arm for a given number of graduations, is less than what it would have to be, were the graduations stationary, and not movable. In short, for a given movement of the test arm, the graduations may be placed farther apart and thus be more easily seen, than they otherwise would be, were the graduations stationary, and not mounted upon a pivoted plate.

A use to which my invention may be put is illustrated in Figs. 9, 10, 11. A piece of iron A, the face of which is to be trued up, is centrally mounted in jaws C of a lathe chuck B, in the usual manner, and in as nearly a correct position as it can be, by the use of the operator's eye. The test apparatus 30 is gripped in a holder D which in turn is secured in a tool post E. The contact end 17 of test arm 6 is moved into contact with the face of the piece A; and the test holder is made fast as by turning down the screws F, G. A carriage not shown in the drawings, but a well known part, say, of the latter, is so moved as to cause the contact end 17 of the test arm to move the pointer arm 5 so that it points to the middle portion of the graduations. The chuck B is then turned over, as by hand, one revolution. If by luck, the pointer 5, and the graduated plate 4 remain in normal position, then the face of the piece A is known to be in a plane at right angles to the axis of the lathe, and the piece is in proper position. Should the pointer 5 move over say the fifteenth graduation, as in Fig. 2, or Fig. 3 (each of which happens to be one quarter thousandth of an inch, the graduations being arbitrary) then the face of the piece is properly rapped with a hammer, to cause it to approach the right plane. By again revolving the chuck B, the pointer 5 may move over only one division, in which case, the face may, for the purpose desired, be "true enough". If not, the operation may be repeated until it is.

To mount a piece, as a disk H, in the chuck B so that its axis will coincide with that of the lathe, the test apparatus 30 may be adjusted, as shown in Fig. 10, so that the contact end 17 of test arm 6 contacts the circumference of the disk, and the pointer occupies the mid position of the graduations. A turn of the chuck, if the disk is not "true", will cause the pointer again to move over the graduations, and indicate the variations in the movements of the pointer arm and the graduated plate. By changing the positions of the jaws holding the disk, the test apparatus will guide the operator in bringing it into the position wanted.

Should the operator desire to mount a piece of iron I, having a round hole $i$ therein, so that the axis of the hole would coincide with that of the lathe, Fig. 11 shows how the test arm is made to contact with the inside of the hole so that any movement of the test arm will be indicated upon the graduated plate, and enable the operator to do what is needed to cause the axes to approach coincidence.

It will be noted that in contacting the three surfaces, shown in Figs. 9, 10, 11, the graduations 8, see also Fig. 1, are uppermost, and directly under the eyes of the operator; that all the parts, except the contact portion of the test arm 6, and all but the extreme end of the pointer 5, and the narrow edge of the graduated plate 4, are compactly confined within the case 1; that so little of the part of the pointer 5 is exposed, that while the machinist is using the device, in the lathe, there is nothing which his sleeves, or clothes can catch to injure the device; and further, when the device is not in use, as when it is in the pocket, the exposed point of the pointer is so protected that its injury by catching upon anything is practically impossible.

While I have shown my invention embodied in the apparatus, particularly shown and described, it is to be understood that I do not limit my invention to the said particular apparatus, for all those skilled in the art, once knowing the principle of my invention, can embody it in different, and equivalent forms, without departing from the spirit thereof. Therefore

What I claim is:—

1. In a test apparatus, a pivoted test arm; a pivoted graduated plate; a pivoted pointer; means movably to connect the graduated plate and the pointer, so that a movement of the graduated plate will cause an opposite movement of the pointer; means for operatively connecting the test arm and the graduated plate; all so designed that when the test arm is moved in one direction, it will cause the graduated plate, and, consequently, the pointer to move in directions opposite to each other, and a movement of the test arm in another direction will cause the graduated plate, and hence the pointer again to move in directions opposite to each other.

2. In a test apparatus, a pivoted test arm; a pivoted graduated plate; a spring, one end portion of which is secured to the base of the apparatus, the other end portion being secured to the graduated plate; a portion of the spring being in the form of a loop, the inside of which engages the pivoted test arm, when the apparatus is in normal position; all being so designed that when the test arm is moved from normal position, in one direction, it disengages the loop, and when moved from normal position in an opposite direction, it engages the loop, and, because of said engagement, moves the graduated plate; said spring always tending to restore the graduated plate to normal position.

3. In a test apparatus, a pivoted test arm; a pivoted graduated plate; a shoulder on the graduated plate for the test arm to engage; a spring engaging the test arm, the graduated plate, and the base of the apparatus; all designed so that a movement of the test arm in one direction, causes it to engage the shoulder and move the graduated plate; and that a movement of the test arm in an opposite direction, causes the spring to move the graduated plate in an opposite direction; the spring also causing the apparatus to restore to normal position.

4. In a test apparatus, a test arm, a graduated plate which is centrally pivoted so as to be balanced upon its pivot, and which has that portion opposite to the graduated end portion, depressed and lying in a plane parallel with that of the graduated portion; a pointer supported upon a pivot, and having its pivot portion lie in the space above the depressed portion of the graduated plate; means whereby this pivot portion is operatively connected to the graduated plate; all designed so that the graduated plate and the pointer will occupy as small space as is possible.

In testimony whereof I affix my signature in presence of two witnesses.

HARRY W. TROTT.

Witnesses:
E. F. UNIAR,
F. J. V. DAKIN.